Oct. 26, 1965   K. O. TECH   3,213,996
TRANSFER MECHANISM
Filed June 20, 1963   3 Sheets-Sheet 1
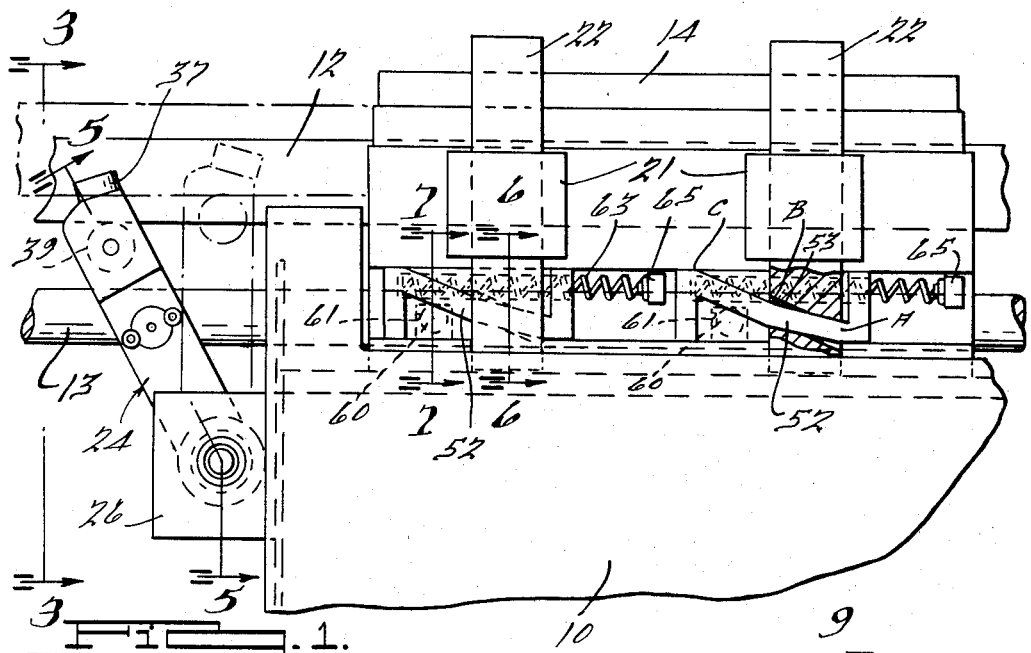
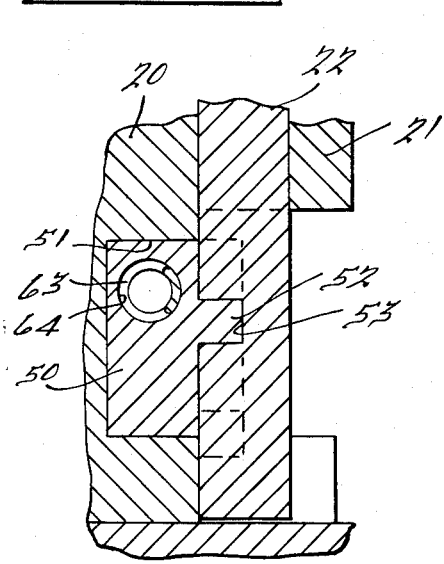
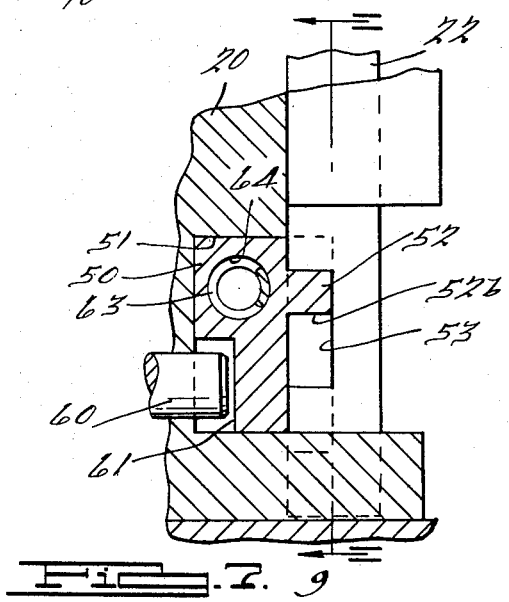
INVENTOR.
Kurt O. Tech
BY Harness, Dickey & Pierce
ATTORNEYS INVENTOR.
Kurt O. Tech
BY
Harness, Dickey & Pierce
ATTORNEYS Oct. 26, 1965　　　　K. O. TECH　　　　3,213,996
TRANSFER MECHANISM
Filed June 20, 1963　　　　　　　　　　3 Sheets-Sheet 3
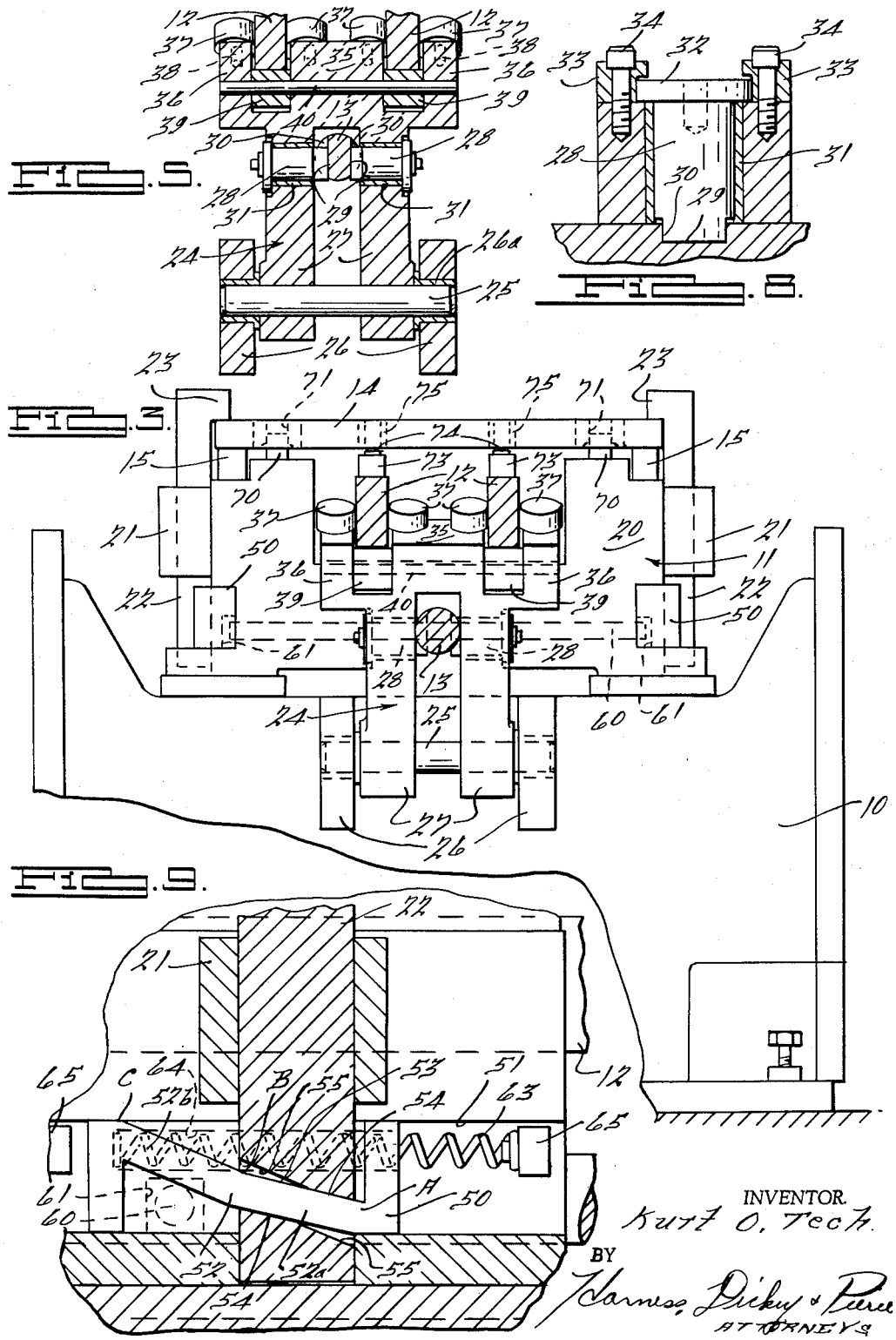
INVENTOR.
Kurt O. Tech
BY
Harness, Dickey & Pierce
ATTORNEYS United States Patent Office 3,213,996
Patented Oct. 26, 1965

3,213,996
TRANSFER MECHANISM
Kurt O. Tech, Grosse Pointe Woods, Mich., assignor to
The Cross Company, Detroit, Mich., a corporation of
Michigan
Filed June 20, 1963, Ser. No. 289,272
10 Claims. (Cl. 198—19)

This invention relates to new and useful improvements in machine tools and, more particularly, to an improved transfer mechanism for mechanically actuating and coordinating the operation of the work locators, the work clamps and the work transfer device with which machine tools are ordinarily equipped.

Heretofore, it has been the usual practice to provide separate actuators for the work locators, the work clamps and the work transfer device and to interlock the same either mechanically or electrically through limit switches and the like so that they perform their intended operations sequentially in the proper order. Many machine tools, and particularly transfer mechanisms of the type forming the subject matter of this invention, have a large number of work stations, so that an exceedingly large number of actuators are required and therefore the control equipment becomes very complex. In practice, this equipment has been a source of trouble, and considerable maintenance is usually required to keep it in proper working order and to keep the consequential down time at a minimum.

An important object of the present invention is to provide novel means for mechanically connecting and correlating the operation of the work locators, the work clamps and the transfer device so as to eliminate much of the control equipment heretofore required and to reduce the incidence of mechanical failure and maintenance in use.

Another important object of this invention is to provide a transfer mechanism which is so reduced in the number and character of its component parts as to approach the ultimate in structural simplicity.

Another object of the invention is to provide a device of this type wherein the structural simplicity of the transfer mechanism creates an economy in its manufacture, installation and maintenance.

The various objects and advantages, and the novel details of construction of one commercially practical embodiment of the invention, will become more apparent as this description proceeds, especially when considered in connection with the accompanying drawings, in which:

FIGURE 1 is a side elevational view of a fragmentary portion of a transfer mechanism showing one work station equipped with the mechanism of this invention with the work in clamped position;

FIGURE 3 is a transverse, sectional elevational view taken substantially on the plane indicated by line 3—3 in FIGURE 1;

FIGURE 5 is a fragmentary, detail sectional view taken substantially on the plane indicated by line 5—5 in FIGURE 1;

FIGURE 6 is a fragmentary, detail sectional view taken substantially on the plane indicated by line 6—6 in FIGURE 1;

FIGURE 7 is a similar view taken substantially on the plane indicated by line 7—7 in FIGURE 1;

FIGURE 8 is a detail sectional view of one of the locking pins connecting the actuator rod to the yoke which actuates the transfer bar; and FIGURE 9 is a detail sectional view taken substantially on the plane indicated by line 9—9 in FIGURE 7 showing the connection between the cam slide and the clamp.

Figure 2:
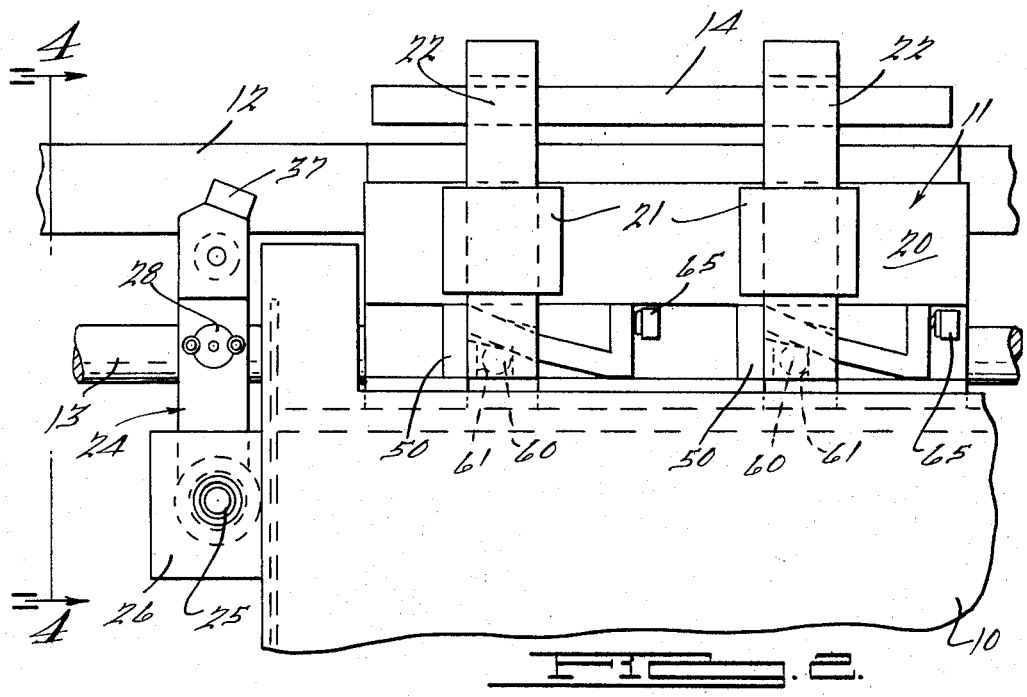
FIGURE 2 is a similar view showing the work clamping means released.

As shown in the drawings, but one unit of the transfer mechanism forming the subject matter of this invention is illustrated. However, these transfer mechanisms are frequently quite large and have a great many stations arranged in a line and uniformly spaced with respect to each other. In practice, workpieces delivered to a loading station at one end of the mechanism are moved or indexed progressively by a suitable transfer device from station to station and eventually to an unloading station at the discharge end of the mechanism where they are moved from the machine for further processing or handling.

In the drawings, the reference character 10 indicates a main base upon which a pallet clamping unit 11 is secured. It will be understood that there will be one pallet clamping unit at each station of the transfer mechanism. Mechanisms of this type are provided with one or more (here shown as a pair) reciprocating transfer bars 12 and a reciprocating actuator rod or bar 13. The pallets 14 are supported in their positions of rest on rails 15. The pallets 14 are here shown in the form of flat rectangular plates, although they may vary in size and shape, depending on the nature of the workpiece supported thereby. Also, the pallets 14 are usually equipped with work clamps or other appurtenances (not shown) for holding a workpiece thereon.

The pallets 14 are indexed from station to station in the machine by the transfer bars 12 which extend lengthwise of the machine through a plurality of stations. If the machine is sufficiently short, a single pair of the transfer bars 12 may serve all of the stations in the machine. However, if necessary or desirable, a plurality or sets of transfer bars may be provided, each serving a predetermined number of stations in the machine. The stations in machines of this type are spaced equidistantly apart and the set of transfer bars 12 is reciprocably actuated a distance equal to the spacing between the stations in any suitable or conventional manner, as for instance by means of a solenoid operated power cylinder (not shown). If more than one set of transfer bars are employed, all of the power cylinders are usually suitably interlocked for synchronous operation of the transfer bars. The actuator rod 13 is also reciprocated in timed relation to the transfer bars by a conventional mechanism (not shown).

The pallet clamping unit 11 comprises a frame 20 secured to the base 10. The frame 20 is provided with a plurality, here shown as four, of sleeve-like guide members 21 to slidably receive clamping members 22 provided with laterally extending clamping lugs 23 adapted to engage the pallet 14, as shown, for instance, in FIGURE 3.

The reference character 24 indicates a lift arm which has its lower end pivotally mounted on a shaft 25 journaled in ears or lugs 26 projecting from the base 10. Bushings 26a may be provided in the lugs 26 in which the ends of the shaft 25 are journaled. At least one lift arm is associated with each pallet clamping unit.

The lift arm 24 is in the form of a yoke member, the lower end of which is bifurcated to form a pair of spaced arms 27 which straddle the actuator rod 13. The lift arm 24 is operatively connected to the actuator rod 13 by means of drive pins 28 which pass laterally through the arms 27 and engage the flat bottoms 29 of oppositely disposed, transversely extending recesses 30. The ends of the drive pins 28 snugly engage the sides of the recesses 30, as shown in FIGURE 8, but by reason of the fact that the recesses extend entirely transversely through the actuator rod 13, the drive pins may move transversely of the actuator rod during the rocking movement of the lift arm 24. Bushings 31 are provided in the arm 27 through which the drive pins 28 pass. Each drive pin 28 is provided with a head 32 engaged by a pair of retainers 33 secured in place by bolts 34; see FIGURE 8.

While the lift arm 24 is shown in the form of a pivotally mounted member swinging about pivots 25, it will be readily apparent that these lift arms may be mounted and actuated in other ways. For instance, the lift arm 24 may be reciprocably mounted in guides and actuated by a pinion and rack mechanism interposed between the actuator rod 13 and the left arm 24. The actuator rod 13 and lift arm 24 could be provided with racks interconnected by gears so that reciprocation of the actuator rod 13 would cause a reciprocation of the lift arm 24. Also, the lift arm could be actuated by hydraulic or other means controlled by a limit switch or the like. Inasmuch as these described mechanisms constitute but mechanical equivalents of the structure shown and described, they have not been illustrated in the drawings.

The upper end of the lift arm is also bifurcated to form a center arm portion 35 and two outside arm portions 36. These arm portions 35 and 36 are provided with rollers 37, rotatably journaled in the arms 35 and 36 by means of stud shafts 38. The rollers 37 are arranged in pairs and each pair is adapted to engage the sides of the adjacent transfer bar 12 to provide laterally disposed antifriction bearings therefor. The lift arm 24 is also provided with a pair of rollers 39 adapted to engage the lower edge of the transfer bars 12. These rollers 39 may be conveniently journaled on a shaft 40 extending transversely through the lift arm 24. Thus, the transfer bars are supported by antifriction means at both sides and at the bottom thereof.

When the actuator rod 13 is reciprocated in one direction (from the left to the right), the lift arm 24 is moved from the position shown in FIGURE 1 to that shown in FIGURE 2 to lift the transfer bars 12 as shown in dotted lines in FIGURE 1 or to the full-line position as shown in FIGURE 2, and as the transfer bars are raised they lift the pallets 14 free of the locating pins 70 so that the pallet 14 may be indexed from one station to the next by the movement of the transfer bars 12 as hereinabove described. During this movement, the transfer bars are supported on the antifriction rollers 37 and 39.

The present invention also contemplates simple but effective means for actuating the clamping members 22 in timed relation to the movement of the transfer bars 12 and the pallet 14. This means consists of a plurality of clamp actuating cam slides 50, one for each of the clamps 22, slidably mounted in a longitudinally extending recess 51 formed in the frame 20. Each cam slide 50 is provided with a laterally extending cam rib 52; see particularly FIGURES 1, 6, 7 and 9, which engages a recess 53 in the opposed face of the clamp member 22. As shown in FIGURES 1 and 9, the cam rib 52 at 52a extends at a relatively low pitch or flat angle between the points A and B and at a higher pitch or angle at 52b between the points B and C. The recess 53 in the clamp member 22 is shaped to provide diagonally offset, opposed areas 54 which are inclined at an angle substantially coincident with the low angle portion 52a of the cam rib 52 and with diagonally offset, opposed areas 55 which substantially coincide with the high angle portion 52b of the cam rib 52.

As shown in FIGURES 1, 2 and 3, the cam slides are arranged in oppositely disposed pairs. For actuating each pair of slides there is provided a transversely extending cam slide actuating rod 60. Each rod 60 passes through the actuator rod 13 so as to partake of the movement of the actuator rod, and the opposite ends of each cam slide actuating rod 60 engage in enlarged recesses 61 formed in the opposed faces of the cam slides 50. This provides a lost motion connection between the cam slide actuating rod 60 and the cam slides 50, for a purpose which will appear more fully hereinafter.

Each cam slide is urged in one direction, to the left as viewed in FIGURES 1 and 2, by means of a spring 63, one end of which engages a recess 64 in the cam slide 50, while the other end engages an abutment 65 secured to the frame 20 of the pallet clamping unit. Each spring 63, when exerting its force to move the cam slide 50 towards the left, as shown in FIGURE 1, brings the low pitch or flat angled portion 52a of the cam rib 52 into engagement with the portions 54 of the recess 53 in the clamp member 22. This lowers the clamp members into engagement with the pallet 14, as shown in FIGURE 1, and this low angle contact between these surfaces provides a positive clamping action of the clamping member 22. When the cam slides 50 have been moved to the right, as shown in FIGURE 2, the portions 55 of the recess 53 engage the high angle portion 52b of the cam rib to raise the clamp members. It will be obvious that the cam rib 52 raises the clamping member 22 at a slower rate when the portion 52a of the cam rib 52 is in engagement with the recess 53 and at a faster rate when the cam rib portion 52b is in engagement with the recess 53 in the clamping member.

It will be understood, however, that the cam ribs 52 may be arranged at a constant angle throughout their length so that the clamping members 22 will be moved at a constant speed.

Each indexing movement of the transfer bars 12 leaves the pallet 14 directly above fixed locating pins 70 which project upwardly from the frame 20. Then when the transfer bars are lowered by movement of the actuator rod 13 and lift arms 24 to the left; viz, from the broken line position to the full line position in FIGURE 1, the pallet settles onto the locating pins 70 which enter sleeved apertures 71 formed in the pallet 14. To facilitate the entrance of the locating pins 70 into the apertures 71, the upper ends of the pins 70 are chamfered or rounded as at 72.

Figure 4:
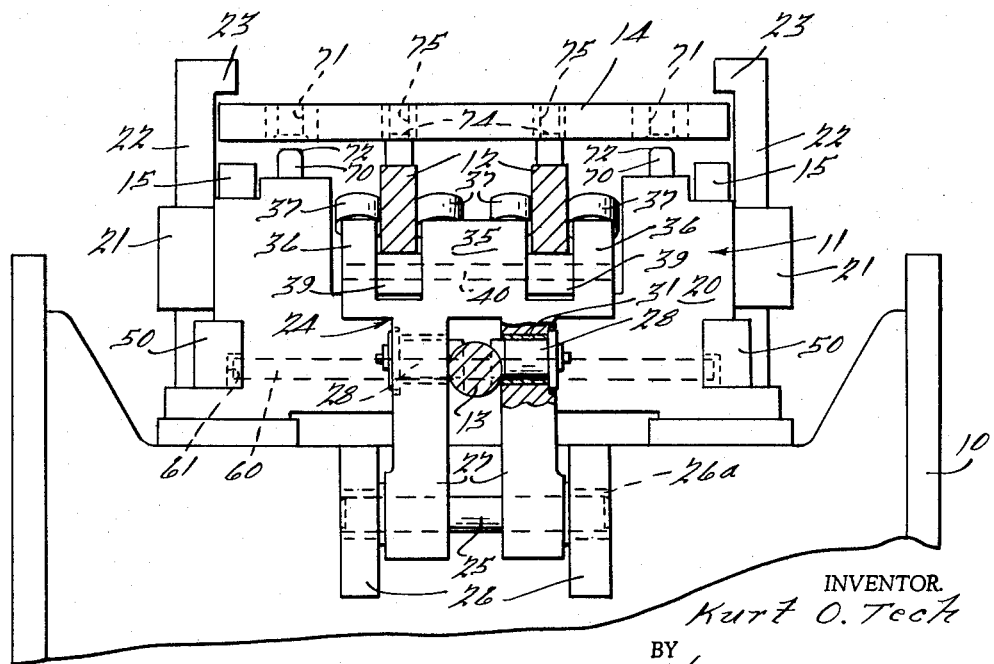
FIGURE 4 is a similar view taken substantially on the plane indicated by line 4—4 in FIGURE 2.

The upper edge of each transfer bar 12 is provided with one or more hardened blocks 73 provided with pallet engaging pins 74 adapted to enter bushing lined recesses 75 in the pallet 14. This provides for a positive engagement between the transfer bars 12 and the pallet 14 so that the pallet may be properly indexed when the transfer bars 12 are reciprocated to the right, as viewed in FIGURES 1 and 2. When the pallets are released by the transfer bars, they will be deposited upon the fixed locating pins 70 and held securely on the rails 15 by the clamping members 22, as shown in FIGURE 3. When the transfer bars 12 are raised and the clamps 22 released, the pallet 14 will be raised off of the locating pins 70, as shown in FIGURE 4. At this time, the pallet engaging pins 74 are in engagement with the recesses 75 in the pallet so that movement of the transfer bars 12 may index the pallet to the next station.

As the actuator rod 13 starts its movement to the right, it starts to move the lift arm 24 from the full-line position shown in FIGURE 1 toward the dotted-line position shown in this figure. During initial movement of the actuator rod 13, the cam slide actuating rod 60 moves in the recess 61 to the right-hand side of this recess, as shown in FIGURE 2. Because of this lost-motion connection between these parts, the cam slides are not initially moved, and this movement of the lift arm merely takes up any slack between the lift arm and the transfer bars 12. When the end of the slide actuating rod 60 engages the right-hand side of the recess 61, the cam slide 50 is moved to the right, as viewed in FIGURES 1 and 2, against the action of the spring 63. During the initial movement of each slide, the associated clamp 22 is raised slowly out of engagement with the pallet 14; and during the continued movement of the slide to the right, as viewed in FIGURE 2, the high angle portion 52b of the cam rib 52 will engage the clamp to rapidly raise the clamp so as to permit the pallet 14 to be raised off of the locating pins 70 by the transfer bars 12. When the actuator rod 13 moves in the opposite direction; that is, to the left, the lift arm 24 will be moved from the full-line position shown in FIGURE 2 to the full-line position shown in FIGURE 1, which will lower the transverse bars 12 and consequently the pallet 14, then in register with the mechanism, onto the locating pins 70. During this movement, the slide actuating rod 60 moves from the right-hand side of the recess 61 to the left to release pressure on the cam slides so that the spring 63 may move the cam slides from the position shown in FIGURE 2 to that shown in FIGURE 1 to bring the low pitch or flat angle portion 52a of the cam rib 52 into engagement with the areas 54 of the recess 53 in the clamp. With the flatter portion 52a of the cam rib 52 in engagement with the areas 54 of the recess 53, the clamping action applied to the clamps 22 is greater and more stable so that the spring 63 associated with each clamp 22 will hold the clamp member firmly in clamped position.

From the foregoing, it will be obvious that with the present invention the operations of locating and clamping the pallets are accomplished in a very efficient manner, with a simple mechanism and with a minimum amount of control equipment. During the lifting of the pallet from the locating pin 70, the cam slides provide means for operating the clamps so that they will be clear of the pallet when it is in position to be shifted by the transfer bars 12, thus preventing any interference between the clamps 22 and the pallet. The lift arm provides means for lifting the transfer bars from an inoperative position into a position in which the transfer bars are interlocked with the pallet, so that upon reciprocation of the transfer bars the pallet may be indexed to the next station. When the next pallet is positioned over the pallet clamping unit, the transfer bars are lowered to deposit the new pallet onto the locating pins and the clamps are operated to positively clamp the pallet in position. The device is the ultimate in structural simplicity and provides for an economy in its manufacture, installation and maintenance.

While one commercially practical embodiment of the invention has been described and illustrated herein somewhat in detail, it will be understood that various changes may be made as may come within the purview of the accompanying claims.

What is claimed is:

1. In a machine tool having a work station, a transfer bar adapted by successive operations to move work-supporting pallets into and out of said station, and a reciprocable actuator rod, that improvement which comprises, a lift arm pivotally mounted adjacent one end and engaging said transfer bar at its other end, means operatively connecting said lift arm to said actuator rod for movement about its pivot upon reciprocation of said actuator rod to raise and lower said transfer bar, a clamp member adapted to engage the pallet, cam means for actuating said clamp member at a varying speed of movement, means connected to said actuator rod for moving said cam means in one direction to disengage said clamp member from the pallet, and spring means for moving said cam means in the opposite direction to engage said clamp member with said pallet.

2. A mechanism as described in claim 1 in which said cam means has cam portions of different pitch.

3. A device as described in claim 1 in which said cam means comprises a cam rib having a portion extending at a low angle and an adjoining portion extending at a relatively high angle, and a recess in the clamp member engaging said cam rib.

4. A device as described in claim 1 in which said cam means comprises a cam rib having a low pitch portion adapted to engage a recess in the clamp member when the clamp member is in clamping position, and having a high pitch portion adapted to engage said recess to rapidly move said clamp member to released position.

5. A mechanism as described in claim 1 in which the actuator rod is provided with opposed transversely extending recesses and said lift arm is provided with opposed drive pins engaging said recesses in contact with the sides of said recesses.

6. A machine tool having spaced in-line stations and rails extending through said stations, locators at each station engageable with a work-carrying pallet in each station to position the pallet accurately therein, a transfer device including a vertically and horizontally movable transfer bar extending through said station engageable with said pallets and operable to move the same from station to station and deposit the same on said rails, a reciprocable actuator rod, a lift arm pivotally mounted adjacent one end and engaging said transfer bar at its other end, means operatively connecting said lift arm to said actuator rod for movement about its pivot upon reciprocation of said actuator rod to raise and lower said transfer bar, a reciprocal clamp member adapted to engage the pallet, a slidable cam member, a cam rib on said cam member, a recess in said clamp member adapted for engagement with said cam rib, means connecting said cam member to said actuator rod for movement in one direction to disengage the clamp member from the pallet, and spring means for moving said cam member in the opposite direction to engage said clamp member with said pallet.

7. A device as described in claim 6 in which the connection between said actuator rod and cam member comprises a rod member connected to said actuator rod at one end, the other end engaging a recess in said cam member.

8. A device as described in claim 6 in which the connection between said actuator rod and cam member comprises a rod member extending through said actuator rod with the end thereof engaging a recess in said cam member, said recess being larger than the diameter of said rod to provide a lost-motion connection between said parts.

9. In a machine tool having a work station, a transfer bar adapted by successive operations to move work-supporting pallets into and out of said station, and a reciprocable actuator rod, that improvement which comprises, a lift arm engaging said transfer bar, means operatively connecting said lift arm to said actuator rod whereby reciprocation of said actuator rod will cause said lift arm to raise and lower said transfer bar, a clamp member adapted to engage the pallet, cam means for actuating said clamp member, means connected to said actuator rod for moving said cam means in one direction to disengage said clamp member from the pallet, and spring means for moving said cam means in the opposite direction to engage said clamp member with said pallet.

10. A machine tool having a work station adapted to receive and support a succession of work pallets; transfer means for moving said pallets individually into and out of said work station including vertically movable transfer bars normally disposed below the pallet position in said station; vertically slidable clamps adapted to engage downwardly against a pallet in said station to hold the same; an actuator adapted to be alternately advanced and retracted; means for transferring motion from said actuator to said transfer bars operative when the actuator is advanced to raise said transfer bars to lift a pallet out of said station and operative when the actuator is retracted to lower said transfer bars to drop a pallet supported thereon into said work station; and means for transferring motion from said actuator to said clamp means operative when the actuator is advanced to raise said clamp means to a pallet release position simultaneously with the lifting of said transfer bars and operative when the actuator is retracted to lower said clamp means into a pallet clamping position as the pallet is dropped into said station by said transfer bars, said last mentioned means being operative after said pallet is released by said transfer bars whereby to assure clamping engagement between said clamp means and said pallet.

References Cited by the Examiner
UNITED STATES PATENTS

| | | | |
|---|---|---|---|
| 2,193,840 | 3/40 | Oberhoffken | 198—19 X |
| 3,155,217 | 11/64 | Cross | 198—19 |

SAMUEL F. COLEMAN, *Primary Examiner.*

EDWARD A. SROKA, *Examiner.*